US012695498B2

(12) United States Patent
Cao et al.

(10) Patent No.: US 12,695,498 B2
(45) Date of Patent: Jul. 28, 2026

(54) TECHNIQUES TO DETERMINE CHARACTERISTICS OF SIGNALS FORWARDED BY A WIRELESS DEVICE

(71) Applicant: ZTE Corporation, Shenzhen (CN)

(72) Inventors: Wei Cao, Shenzhen (CN); Nan Zhang, Shenzhen (CN); Jianwu Dou, Shenzhen (CN); Kaibo Tian, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 380 days.

(21) Appl. No.: 18/475,745

(22) Filed: Sep. 27, 2023

(65) Prior Publication Data

US 2024/0022314 A1      Jan. 18, 2024

Related U.S. Application Data

(63) Continuation of application No. PCT/CN2021/104477, filed on Jul. 5, 2021.

(51) Int. Cl.
*H04B 7/155* (2006.01)
*H04L 5/00* (2006.01)

(52) U.S. Cl.
CPC ....... *H04B 7/15514* (2013.01); *H04L 5/0092* (2013.01)

(58) Field of Classification Search
CPC .......................... H04B 7/15514; H04L 5/0092
(Continued)

(56) References Cited

U.S. PATENT DOCUMENTS

2015/0341915 A1* 11/2015 Lyu ........................ H04W 72/04
370/277
2021/0037445 A1      2/2021 Abedini et al.
(Continued)

FOREIGN PATENT DOCUMENTS

CN      110149711      8/2019
CN      110972266      4/2020
(Continued)

OTHER PUBLICATIONS

Office Action for co-pending KR Application No. 10-2023-7035710, Office Action dated Sep. 8, 2025, 16 pages with Google translation.
(Continued)

*Primary Examiner* — Asad M Nawaz
*Assistant Examiner* — Hugh Mark Ashley
(74) *Attorney, Agent, or Firm* — Perkins Coie LLP

(57) ABSTRACT

Techniques are described to indicate characteristics (e.g., configuration related control information and/or scheduling related control information) of signals forwarded by a smart node to a base station (BS) and/or to a user equipment (UE). An example wireless communication method includes receiving, by a first network node from a second network node, a configuration information that configures the first network node, and transmitting, by the first network node to a communication node or to the second network node, a first signal comprising a first information according to the con-figuration information, where, prior to the transmitting, the first network node receives from the second network node or from the communication node a second signal comprising a second information that includes the first information.

14 Claims, 8 Drawing Sheets

(58) Field of Classification Search
USPC ........................................................ 370/315
See application file for complete search history.

(56) References Cited

U.S. PATENT DOCUMENTS

| | | | | |
|---|---|---|---|---|
| 2021/0127389 A1* | 4/2021 | Liu | .................... | H04W 72/0446 |
| 2021/0258999 A1* | 8/2021 | Xu | ........................... | H04L 5/001 |

FOREIGN PATENT DOCUMENTS

| | | |
|---|---|---|
| CN | 110972279 | 4/2020 |
| CN | 112469130 | 3/2021 |
| CN | 112740797 | 4/2021 |
| KR | 2019-0103339 A | 9/2019 |
| KR | 2019-0105239 A | 9/2019 |
| KR | 2021-0028699 A | 3/2021 |
| WO | 2020/190705 | 9/2020 |

OTHER PUBLICATIONS

Office Action for co-pending VN Application No. 1-2023-07337, Office Action dated Dec. 1, 2025, 4 pages with unofficial translation.
International Search Report and Written Opinion for PCT/CN2021/104477, filed Jul. 5, 2021, Report dated Feb. 24, 2022, 9 pages.
Huawei, et al. "Physical layer design for NR IAB" 3GPP TSG RAN WG1 Meeting #95 R1-1812198 Spokane, USA, Nov. 12-16, 2018, 15 pages.
Extended European Search Report for co-pending EP Application No. 21948736.0, Report dated Apr. 5, 2024, 8 pages.
Notice of Allowance for Korean Patent Application No. 10-2023-7035710, dated Feb. 26, 2026, 14 pages with unofficial English translation.

* cited by examiner

Receiving, by a first network node from a second network node, a configuration information that configures the first network node

302

Transmitting, by the first network node to a communication node or to the second network node, a first signal comprising a first information according to the configuration information

304

402

Receiving, by a first network node from a second network node, a scheduling information

404

Transmitting, by the first network node, a first signal comprising a first information according to the scheduling information

500

Memory
505

Processor(s)
510

Transmitter
515

Receiver
520

TECHNIQUES TO DETERMINE CHARACTERISTICS OF SIGNALS FORWARDED BY A WIRELESS DEVICE

CROSS-REFERENCE TO RELATED APPLICATION

This application is a continuation and claims priority to International Application No. PCT/CN2021/104477, filed on Jul. 5, 2021, the disclosure of which is hereby incorporated by reference herein in its entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for indicating characteristics of signals forwarded by a smart node to a base station (BS) and/or to a user equipment (UE).

An example wireless communication method, comprises receiving, by a first network node from a second network node, a configuration information that configures the first network node; and transmitting, by the first network node to a communication node or to the second network node, a first signal comprising a first information according to the configuration information, where, prior to the transmitting, the first network node receives from the second network node or from the communication node a second signal comprising a second information that includes the first information.

In some embodiments, the configuration information is according to a pre-defined rule. In some embodiments, the configuration information includes a granularity indication, and where the granularity indication includes a slot-level indication that indicates whether the first information includes a slot-level information from the second information, or where the granularity indication includes a symbol-level indication that indicates whether the first information includes a symbol-level information from the second information. In some embodiments, the configuration information includes a slot length or a symbol length, where the first network node determines the slot length or the symbol length of the first signal, and where the slot length or the symbol length is determined using a sub-carrier spacing of a reference signal received by the first network node in response to the first network node determining an absence of an indication of the slot length or the symbol length from the second network node. In some embodiments, the configuration information includes a slot length or a symbol length, the first network node determines the slot length or the symbol length of the first signal, the slot length or the symbol length is determined using a first sub-carrier spacing from a pre-defined table, the pre-defined table includes a first set of sub-carrier spacing including a first sub-carrier spacing and a second set of sub-carrier spacing including a second sub-carrier spacing, each sub-carrier spacing from the first set of sub-carrier spacing is associated with one sub-carrier spacing from the second set of sub-carrier spacing, the first network node determines that the first sub-carrier spacing is associated with the second sub-carrier of a reference signal received by the first network node, and the first sub-carrier spacing is determined in response to the first network node determining an absence of an indication of the slot length or the symbol length from the second network node.

In some embodiments, the configuration information includes a slot length or a symbol length, the first network node determines the slot length or the symbol length by receiving one or more bits that indicate a sub-carrier spacing of a reference signal, and the slot length or the symbol length is based on the sub-carrier spacing of the reference signal. In some embodiments, the reference signal includes a synchronization signal block (SSB). In some embodiments, the configuration information includes: a transmission period that indicates a length of time in which the second information in the second signal is received by the first network node, a frequency band shift value that indicates a difference in frequency between the first signal and the second signal, or one or more frequencies that the first network node is to forward. In some embodiments, the method further comprises receiving, by the first network node from the second network node and prior to the transmitting, the configuration information that configures the first network node.

Another example wireless communication method, comprises receiving, by a first network node from a second network node, a scheduling information; and transmitting, by the first network node, a first signal comprising a first information according to the scheduling information, where, prior to the transmitting, the first network node receives from the second network node a second signal comprising a second information that includes the first information.

In some embodiments, the scheduling information includes: a transmission period that indicates a first length of time in which the second information in the second signal is received by the first network node, a start time in the transmission period when the first signal is transmitted, and a second length of time during which the first signal is transmitted. In some embodiments, the start time is located at a position in time domain when the transmission period starts. In some embodiments, the scheduling information includes: a start time when the first signal is transmitted to a communication node, and a length of time during which the first signal is transmitted. In some embodiments, the start time is located at an offset from when the scheduling information is received by the first network node. In some embodiments, the scheduling information includes a frequency band related information. In some embodiments, the frequency band related information indicates to the first network node a frequency band shift value that indicates a difference in frequency between the first signal and the second signal. In some embodiments, the frequency band related information indicates to the first network node one or more frequencies that the first network node is to forward, and the first signal and the second signal are transmitted and received on the one or more frequencies. In some embodiments, the method further includes receiving, by the first network node from the second network node, the scheduling information prior to the transmitting. In some embodiments, the second network node includes a base station (BS), and wherein the communication node includes a user equipment (UE).

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

With the development of the new radio (NR) access technologies (e.g., 5G), a broad range of use cases including enhanced mobile broadband, massive machine-type communications (MTC), critical MTC, etc., can be realized. To support these use cases, more stringent requirements such as ultra-high data rate and energy efficiency, global coverage and connectivity, as well as extremely high reliability and low latency have to be met. Higher frequency bands including millimeter wave (mmWave) and even terahertz have been used in NR to utilize their large and available bandwidth. However, more active nodes and more antennas are needed to compensate for the higher propagation loss for higher frequency bands, which means high hardware cost/power consumption and severe interference.

To at least improve coverage with low cost and/or improve data rate with extra diversity, a smart node can be used in the NR network. The BS transmits control information to the smart node to control the signal forwarding operations performed by the smart node. The smart node can forward the signal received from the BS to a UE or a UE group. The smart node can also forward the signal received from a UE or a UE group to the BS. The signal forwarding by the smart node can be switched on/off. The smart node can include a planar surface with a large number of passive reflecting elements (e.g., a reconfigurable intelligent surface (RIS)) or an amplifier plus a forwarding bent-pipe device (e.g., a bent-pipe relay or bent-pipe repeater). The smart node can induce a controllable amplitude and/or phase change to the incident signal using the control information from the BS. Therefore, the spatial direction used for the signal forwarding by the smart node can be controlled by the BS.

Figure 1A:
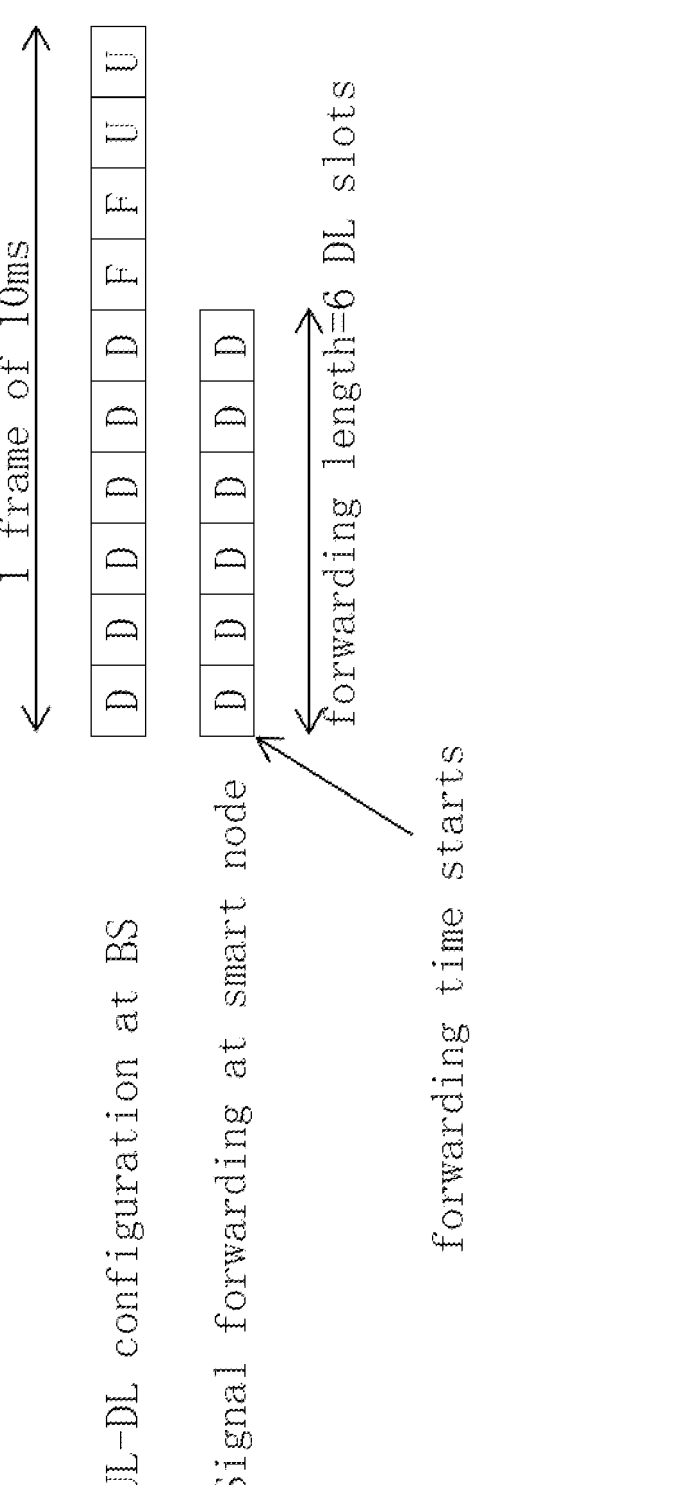
FIG. 1A shows an example of at least some portion of a frame transmitted by a base station (BS) being forwarded by a smart node based on control information.

FIG. 1A shows an example of at least some portion of a frame transmitted by a BS being forwarded by a smart node based on control information. A frame of 10 ms is defined in the 5G NR system. In this example, the 10 ms frame consists of 10 slots with 1 ms per slot, where "D", "F" and "U" stand for downlink, flexible and uplink, respectively. The BS transmits control information to the smart node. The smart node forwards only the 6 DL slots according to the control information. In this example, the control information used in signal forwarding includes:

1. The granularity is slots,
2. The slot length is 1 ms,
3. The forwarding time starts from slot #0,
4. The forwarding length is 6 slots, and/or
5. Possible repetition of forwarding pattern may be applied for semi-static UL-DL configuration.

In this patent document, the control information transmitted on the interface between a BS and a smart node is proposed. In this patent document, at least the following technical problems and corresponding technical solutions/methods have been presented.

Embodiment 1: Configuration Related Control Information

Case 1—Granularity indication based on a predefined rule or OAM configuration: The granularity indication, e.g., slots or symbols, is predefined or configured, which is known by both the BS and the smart node.

Case 2—Granularity indication based on explicit granularity indication from the BS: The granularity indication, e.g., slots or symbols, is indicated by BS to the smart node.

Case 3—Slot length or symbol length based on the DL reference signal's configuration: The slot length or symbol length used by the smart node is calculated using the DL reference signal's subcarrier spacing (SCS).

Case 4—Slot length or symbol length based on the DL reference signal's configuration and predefined rules: The slot length or symbol length used by the smart node is calculated using predefined rule associated with the DL reference signal's subcarrier spacing (SCS).

Case 5 Slot length or symbol length based on explicit indication: The slot length or symbol length used by the smart node is indicated by the BS.

Case 6—Semi-static UL-DL configuration: The UL-DL configuration used by the smart node is indicated by the BS.

Case 7—Frequency band configuration: The frequency band used by the smart node is indicated by the BS.

Embodiment 2: Scheduling Related Control Information

Case 1—Semi-static forwarding time start and length: The UL-DL configuration used by the smart node is indicated by the BS. The forwarding time start and length is indicated by the BS. And the smart node uses the UL-DL configuration for periodic transmission.

Case 2—Dynamic forwarding time start and length: The forwarding time start and length is indicated by the BS.

Case 3—Frequency band related information: The frequency band used by the smart node is indicated by the BS.

I. Introduction and Smart Node Example Scenarios

Figure 1B:
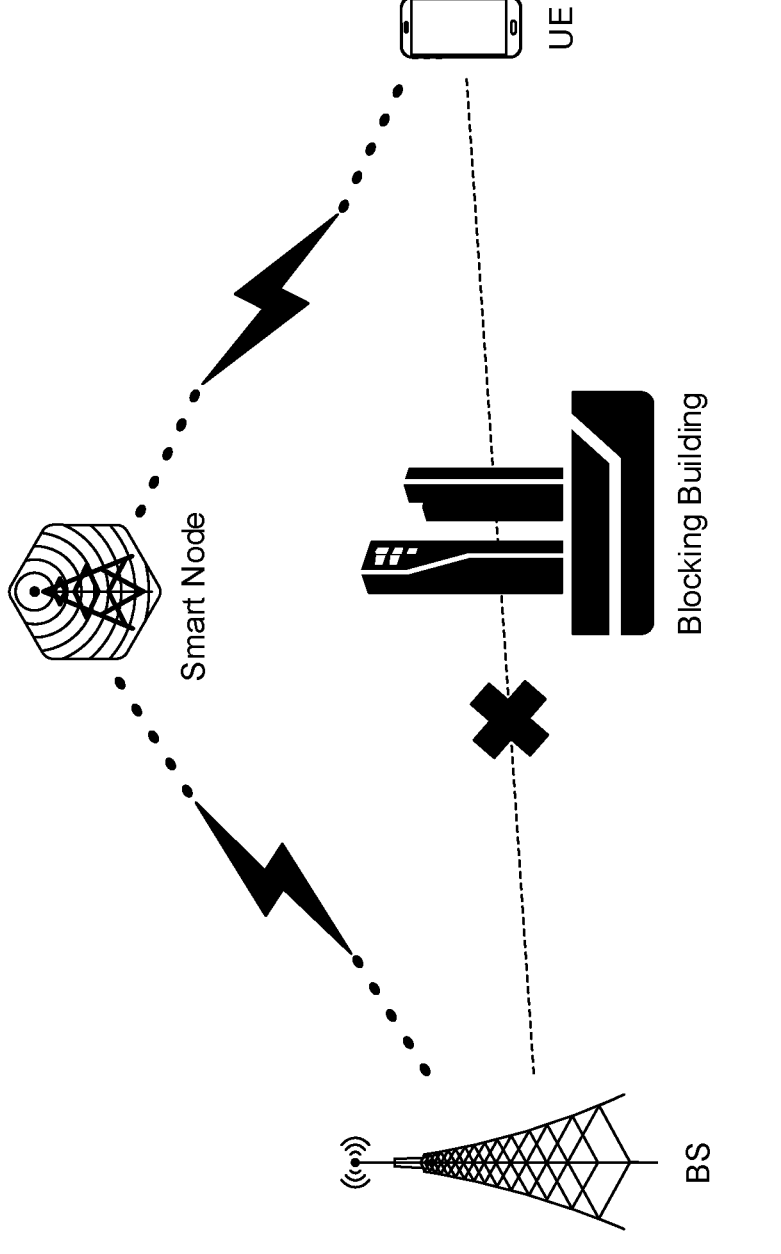
FIGS. 1B and 1C show examples of use cases for a smart node.
Figure 1C:
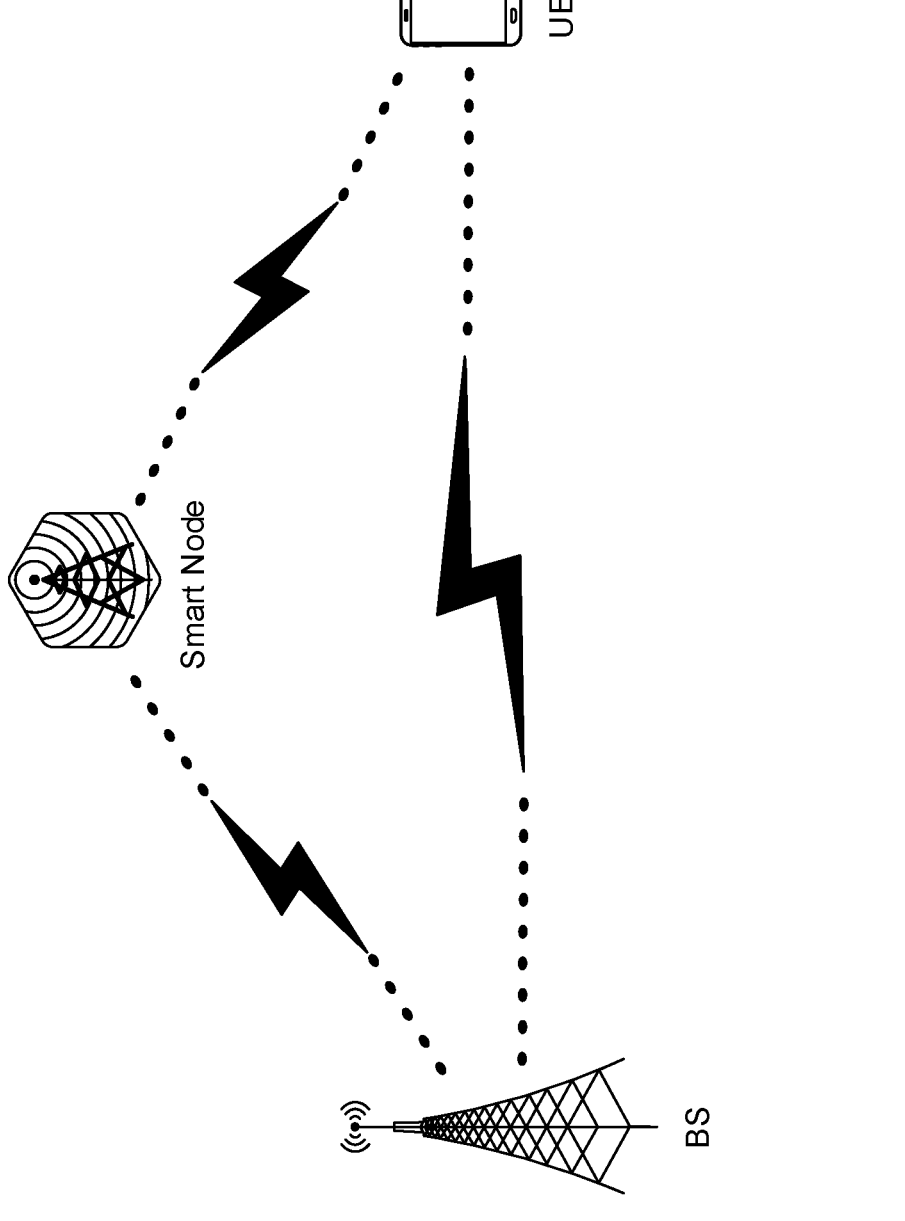

The major use cases of a smart node are illustrated in FIGS. 1B and 1C. In FIG. 1B, the smart node can improve the coverage by adding a new reflecting path. In FIG. 1C, the smart node can improve the data rate by adding extra multipath diversity.

The smart node can include a planar surface with a large number of passive reflecting elements (e.g., a reconfigurable intelligent surface (RIS)) or an amplifier plus a forwarding bent-pipe device (e.g., a bent-pipe relay or bent-pipe repeater). The smart node can induce a controllable amplitude and/or phase change to the incident signal using the control information from the BS.

Though the DL signal forwarding can be a common use case, UL signal forwarding by the smart node can be supported by the control information described in this patent document.

In an NR system, initial downlink (DL) synchronization can be carried out by the smart node using synchronization signal block (SSB). From the SSB, following information can be obtained at the smart node's PHY layer.

1. The base station's (BS's) frequency band
2. The subcarrier spacing (SCS) of SSB
3. The SSB's symbol length, which is calculated as $1/(SSB's \ SCS)$
4. The SSB's slot length, which is calculated as $15/(SSB's \ SCS)$.
5. The number of SSBs, $L_{max}$
6. The SSB index
7. The frame index lower 4 bits, e.g., per 160 ms
8. The half frame indication, e.g., per 5 ms In an NR system, the UL/DL scheduling granularity in the time domain can be slots or symbols. Therefore, if the smart node forwards the signal to the UE(s) or to BS, the granularity of signal forwarding in the time domain can be slots or symbols. As further explained in this patent document, the smart node may receive following control information:

1. The granularity indication, e.g., slots or symbols,
2. The slot length or the symbol length,
3. The forwarding time start,
4. The forwarding length, and/or
5. The possible repetition of forwarding pattern, which may be one or more.

If the smart node is connected with the BS using wired backhaul, the control information listed above and/or in this patent document can be configured to the smart node over the wired connection.

The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

II. Embodiment 1: Configuration Related Control Information a. Case 1—Granularity Indication Based on a Predefined Rule or OAM Configuration The granularity indication, e.g., slots or symbols, can be predefined as a known rule by both the BS and the smart node. The granularity indication can be indicated to the smart node in deployment by the OAM.

b. Case 2—Granularity Indication Based on Explicit Granularity Indication from the BS The granularity indication, e.g., slots or symbols, can be explicitly indication by the BS to the smart node. For example, 1 bit can be used to indicate the forwarding signal's granularity is slots or symbols.

c. Case 3—Slot Length or Symbol Length Based on the DL Reference Signal's Configuration After successfully detection of a downlink reference signal (e.g., SSB in an NR system), the smart node knows the SSB's symbol length and the SSB's slot length, which is calculated as $1/(SSB's \ SCS)$ and $15/(SSB's \ SCS)$, respectively. In some embodiments, if the BS does not provide a slot length, or a symbol length, or a reference SCS used to determine the slot length or the symbol length, then the smart node determines to use the SSB's slot length or the SSB's symbol length in signal forwarding.

d. Case 4—Slot Length or Symbol Length Based on the DL Reference Signal's Configuration and Predefined Rules After successfully detection of a downlink reference signal (e.g., SSB in an NR system), the smart node knows the SSB's symbol length and the SSB's slot length, which is calculated as $1/(SSB's \ SCS)$ and $15/(SSB's \ SCS)$, respectively. In some embodiments, if the BS does not provide a slot length, or a symbol length, or a reference SCS used to determine the slot length or the symbol length, a predefined table (for example, as shown below) can be used by the smart node to determine a reference SCS. Then the slot length and the symbol length can be calculated using the reference SCS. In current NR system, the SSB's SCS is defined in the left column in the table below. The corresponding reference SCS can be predefined as shown in the right column in the table below. Thus, in such embodiments, the smart node determines the SSB's SCS is 120 kHz after successful SSB detection. Then the smart node determines the reference SCS is 60 kHz using the table. And the smart node calculates the symbol length and the slot length as $1/(reference \ SCS)$ and $15/(reference \ SCS)$, respectively.

| Downlink Reference Signal's (e.g., SSB's) SCS | Reference SCS |
| --- | --- |
| 15 kHz | 15 kHz |
| 30 kHz | 30 kHz |
| 30 kHz | 30 kHz |
| 120 kHz | 60 kHz |
| 240 kHz | 120 kHz | e. Case 5 Slot Length or Symbol Length Based on Explicit Indication

In some embodiments, the BS can provide to the smart node explicit indication of the reference SCS. In such embodiments, the BS can use the format shown in the table below. For example, the BS can transmit two bits that indicate a reference SCS (e.g., 60 kHz) in FR1.

| Frequency Range (FR) index | Reference SCS |
| --- | --- |
| FR 1 | 2 bits: {15, 30, 60, spare} kHz |
| FR 2 | 1 bit: {60, 120} kHz |

In some embodiments, the BS can provide to the smart node explicit indication of the slot length or symbol length in the unit of absolute time unit, e.g., millisecond (ms).

If DL and UL uses different reference SCSs, two explicit indications should be provided by the BS, respectively, to the smart node. To save signaling, one explicit indication for DL (or UL) reference SCS can be provided (called SCSref1), and a scaling factor (called SFscs ref) can be provided together to calculate the UL (or DL) reference SCS (called SCSref2, where SCSref2=SCSref1*SFscs ref in some embodiments).

f. Case 6—Semi-Static UL-DL Configuration

In a given network, the TDD UL-DL configuration is generally semi-static. If the smart node is to forward a part of each UL-DL transmission period, in some embodiments, the BS should configure following information to the smart node.

1. The period of a UL-DL transmission or transmission period.
        (i) This can be in the unit of slot/symbol determined by the reference SCS.
        (ii) This can be in the unit of predefined frame or subframe.
        (iii) This can be in the unit of absolute time unit, e.g., millisecond (ms). In this case, in some embodiments, it should be guaranteed that the period is divisible by a slot or a symbol length.

g. Case 7—Frequency Band Configuration

Figures 2A, 2B:
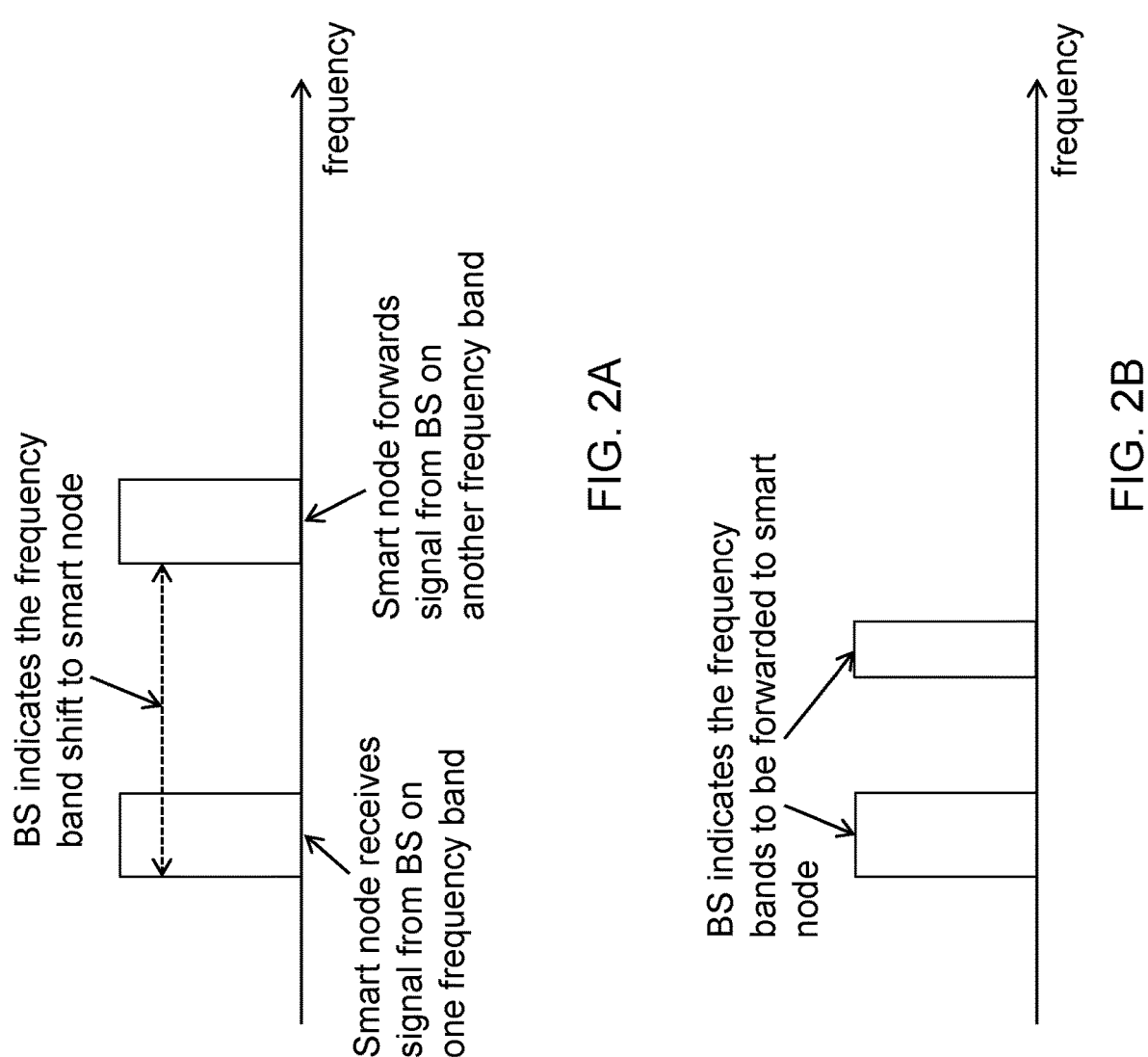
FIGS. 2A and 2B show examples of frequency related information indicated by the BS to the smart node.

In some embodiments, as shown in FIG. 2A, the smart node forwards the received signal with a frequency band shift. The frequency band shift value can be configured by the BS to the smart node. In some embodiments, as shown in FIG. 2B, the BS uses one or more discontinuous frequency bands in communication. And the smart node can forward signal with RF filtering. FIG. 2B shows the one or more frequency bands that the BS configures to the smart node to forward.

If the smart node supports signal forwarding with frequency band shift and/or frequency band filtering. The BS can configure following information to the smart node.

1. The frequency band shift.
    (i) The frequency band shift can be a number of SCSs/PRB s/channel rasters.
        (ii) The frequency band shift can be a number of absolute frequency units (e.g., Hz).
    2. The frequency band to be forwarded.
        (i) The frequency band can be one or more.
        (ii) Each frequency band can be indicated using a frequency band start and a frequency bandwidth.
    (iii) Each frequency band can be indicated using a frequency band start and a frequency band end.

IV. Embodiment 2: Scheduling Related Control Information a. Case 1—Semi-Static Forwarding Time Start and Length In a given network, the TDD UL-DL configuration is generally semi-static. If the smart node is to forward a part of each UL-DL transmission period, in some embodiments, the BS should provide following information to the smart node.

2. The period of a UL-DL transmission or transmission period.
        (i) This can be in the unit of slot/symbol determined by the reference SCS.
        (ii) This can be in the unit of predefined frame or subframe.

(iii) This can be in the unit of absolute time unit, e.g., millisecond (ms). In this case, in some embodiments, it should be guaranteed that the period is divisible by a slot or a symbol length.
    3. The forwarding time start in a UL-DL transmission period.
        (i) This can be an offset from the boundary of the UL-DL transmission period. The offset can be a number of slots/symbols/subframes/frames or a number of absolute time units. Generally, the unit of the offset should be aligned with the unit used in the UL-DL transmission period definition.
        (ii) DL slots/symbols is generally put at the beginning of a UL-DL transmission period. In this case, if the smart node is to forward DL slots/symbols from a BS, the forwarding time start in a UL-DL transmission period can be omitted, since it is zero.
        (iii) The forwarding time start can take effect from the next UL-DL transmission period, which allows the smart node to have enough time to process the indication received during current UL-DL transmission period, where the next UL-DL transmission immediately follows in time the current UL-DL transmission period.
    4. The forwarding length.
        (i) The forwarding length be a number of slots/symbols/subframes/frames or a number of absolute time units.
        (ii) The forwarding length can be a combination of numbers of slots/symbol s/subframes/frames.
        (iii) The forwarding time start plus the forwarding length should not exceed the length of the UL-DL transmission period if repetition based on the UL-DL transmission period is used in signal forwarding.
        (iv) In some embodiments, the forwarding length can be less than or equal to the UL-DL transmission period. In some other embodiments, the forwarding length can be greater than the UL-DL transmission period.

In some implementations of Embodiment 2, Case 1, the BS can transmit information to the smart node and the smart node can forward that information to the UE in a UL-DL transmission period at the forwarding time start and during the forwarding length, where the UL-DL transmission period, the forwarding time start, and the forwarding length are indicated by the BS to the smart node. In some implementations of Embodiment 2, Case 1, the smart node can be activated by reception of the forwarding time start. In some implementations of Embodiment 2, Case 1, the smart node's power amplifier can be switched on by reception of the forwarding time start, and the smart node's power amplifier can be switched off according to the forwarding length.

b. Case 2—Dynamic Forward Time Start and Length

The forwarding time start and the forwarding length can be provided to the smart node by the BS using dynamic signaling. In this case, the BS should provide following information to the smart node.

1. The forwarding time start.
        (i) This can be an offset from the reception of the dynamic signaling. The offset can be a number of slots/symbols/subframes/frames or a number of absolute time units.
        (ii) This can be an offset from the reception of the dynamic signaling. The offset can be a combination of numbers of slots/symbols/subframes/frames.

9

2. The forwarding length.
    (i) The forwarding length can be a number of slots/
       symbols/subframes/frames or a number of absolute
       time units.
    (ii) The forwarding length can be a combination of
       numbers of slots/symbol s/subframes/frames.

In some implementations of Embodiment 2, Case 2, the BS can transmit information to the smart node and the smart node can forward that information to the UE at the forwarding time start and during the forwarding length, where the forwarding time start and the forwarding length are indicated by the BS to the smart node. In some implementations of Embodiment 2, Case 2, the smart node can be activated by reception of the forwarding time start. In some implementations of Embodiment 2, Case 2, the smart node's power amplifier can be switched on by reception of the forwarding time start, and the smart node's power amplifier can be switched off according to the forwarding length.

c. Case 3—Frequency Band Related Information

In some embodiments, as shown in FIG. 2A, the smart node forwards the received signal with a frequency band shift. The frequency band shift value is indicated by the BS to the smart node. In some embodiments, as shown in FIG. 2B, the BS uses one or more discontinuous frequency bands in communication. And the smart node can forward signal with RF filtering. FIG. 2B shows the one or more frequency bands that the BS indicates to the smart node to forward.

If the smart node supports signal forwarding with frequency band shift and/or frequency band filtering. The BS can provide following information to the smart node.

3. The frequency band shift.
    (iii) The frequency band shift can be a number of
       SCSs/PRB s/channel rasters.
    (iv) The frequency band shift can be a number of
       absolute frequency units (e.g., Hz).
4. The frequency band to be forwarded.
    (iv) The frequency band can be one or more.
    (v) Each frequency band can be indicated using a
       frequency band start and a frequency bandwidth.
    (vi) Each frequency band can be indicated using a
       frequency band start and a frequency band end.

Figure 3:
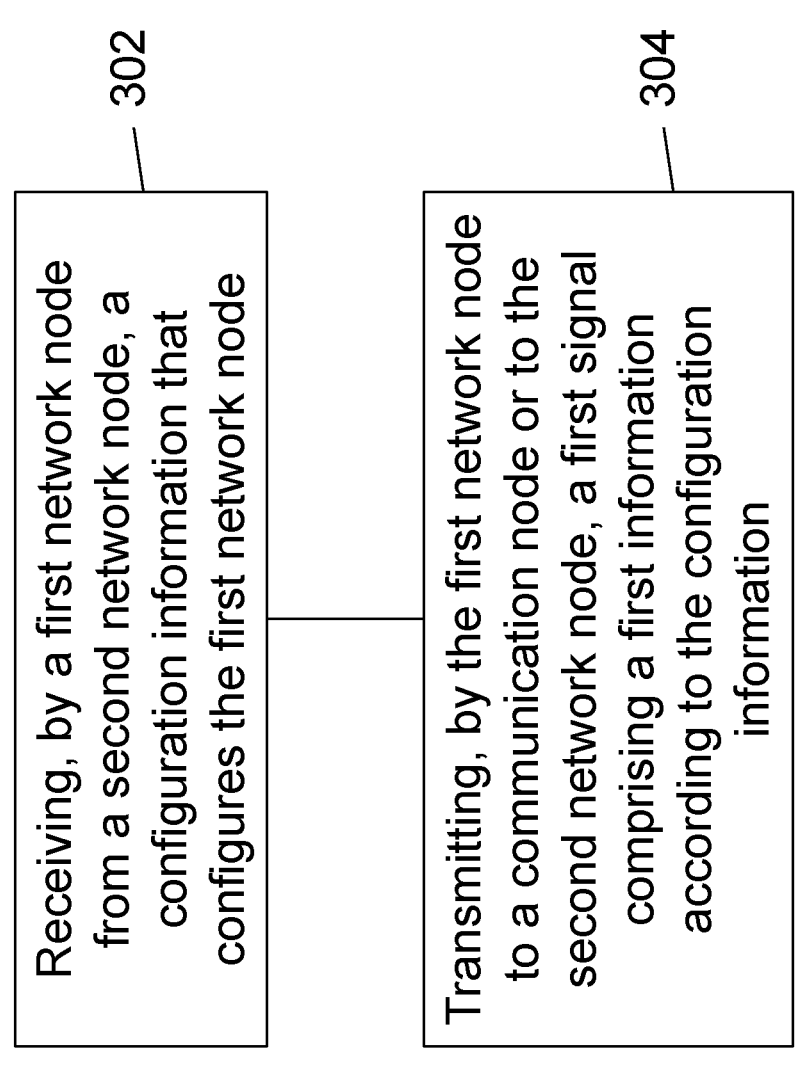
FIG. 3 shows an exemplary flowchart for a smart node to operate using a configuration related control information.

FIG. 3 shows an exemplary flowchart for a smart node to operate using a configuration related control information. Operation 302 includes receiving, by a first network node from a second network node, a configuration information that configures the first network node. Operation 304 includes transmitting, by the first network node to a communication node or to the second network node, a first signal comprising a first information according to the configuration information, wherein, prior to the transmitting, the first network node receives from the second network node or from the communication node a second signal comprising a second information that includes the first information.

In some embodiments, the configuration information is according to a pre-defined rule. In some embodiments, the configuration information includes a granularity indication, and where the granularity indication includes a slot-level indication that indicates whether the first information includes a slot-level information from the second information, or where the granularity indication includes a symbol-level indication that indicates whether the first information includes a symbol-level information from the second information. In some embodiments, the configuration information includes a slot length or a symbol length, where the first network node determines the slot length or the symbol length of the first signal, and where the slot length or the symbol length is determined using a sub-carrier spacing of a reference signal received by the first network node in response to the first network node determining an absence of an indication of the slot length or the symbol length from the second network node. In some embodiments, the configuration information includes a slot length or a symbol length, the first network node determines the slot length or the symbol length of the first signal, the slot length or the symbol length is determined using a first sub-carrier spacing from a pre-defined table, the pre-defined table includes a first set of sub-carrier spacing including a first sub-carrier spacing and a second set of sub-carrier spacing including a second sub-carrier spacing, each sub-carrier spacing from the first set of sub-carrier spacing is associated with one sub-carrier spacing from the second set of sub-carrier spacing, the first network node determines that the first sub-carrier spacing is associated with the second sub-carrier of a reference signal received by the first network node, and the first sub-carrier spacing is determined in response to the first network node determining an absence of an indication of the slot length or the symbol length from the second network node.

In some embodiments, the configuration information includes a slot length or a symbol length, the first network node determines the slot length or the symbol length by receiving one or more bits that indicate a sub-carrier spacing of a reference signal, and the slot length or the symbol length is based on the sub-carrier spacing of the reference signal. In some embodiments, the reference signal includes a synchronization signal block (SSB). In some embodiments, the configuration information includes: a transmission period that indicates a length of time in which the second information in the second signal is received by the first network node, a frequency band shift value that indicates a difference in frequency between the first signal and the second signal, or one or more frequencies that the first network node is to forward. In some embodiments, the method further comprises receiving, by the first network node from the second network node and prior to the transmitting, the configuration information that configures the first network node.

Figure 4:
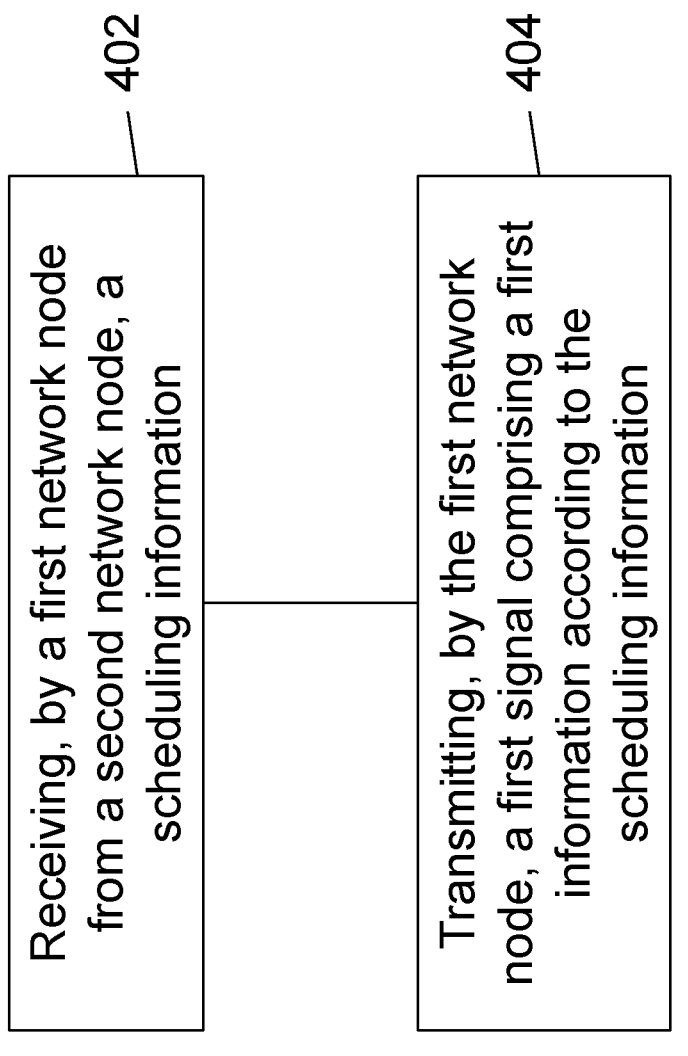
FIG. 4 shows an exemplary flowchart for a smart node to operate using a scheduling related control information.

FIG. 4 shows an exemplary flowchart for a smart node to operate using a scheduling related control information. Operation 402 includes receiving, by a first network node from a second network node, a scheduling information. Operation 404 includes transmitting, by the first network node, a first signal comprising a first information according to the scheduling information, where, prior to the transmitting, the first network node receives from the second network node a second signal comprising a second information that includes the first information.

In some embodiments, the scheduling information includes: a transmission period that indicates a first length of time in which the second information in the second signal is received by the first network node, a start time in the transmission period when the first signal is transmitted, and a second length of time during which the first signal is transmitted. In some embodiments, the start time is located at a position in time domain when the transmission period starts. In some embodiments, the scheduling information includes: a start time when the first signal is transmitted to a communication node, and a length of time during which the first signal is transmitted. In some embodiments, the start time is located at an offset from when the scheduling information is received by the first network node. In some embodiments, the scheduling information includes a frequency band related information.

In some embodiments, the frequency band related information indicates to the first network node a frequency band shift value that indicates a difference in frequency between the first signal and the second signal. In some embodiments, the frequency band related information indicates to the first network node one or more frequencies that the first network node is to forward, and the first signal and the second signal are transmitted and received on the one or more frequencies. In some embodiments, the method further includes receiving, by the first network node from the second network node, the scheduling information prior to the transmitting. In some embodiments, the second network node includes a base station (BS), and wherein the communication node includes a user equipment (UE).

Figure 5:
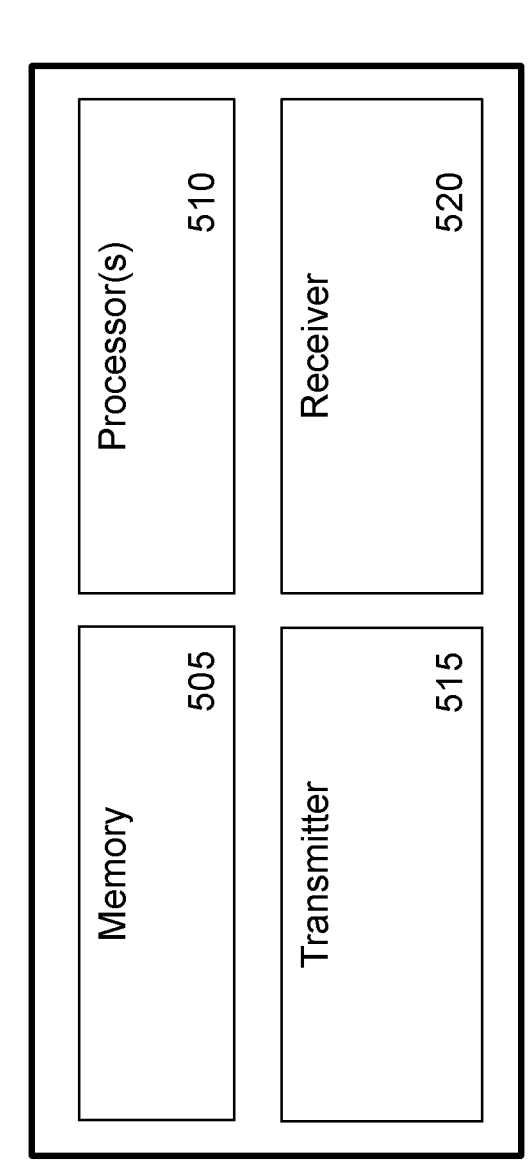
FIG. 5 shows an exemplary block diagram of a hardware platform that may be a part of a network node, a smart node, or a user equipment.

FIG. 5 shows an exemplary block diagram of a hardware platform 500 that may be a part of a network node or a smart node or a user equipment. The hardware platform 500 includes at least one processor 510 and a memory 505 having instructions stored thereupon. The instructions upon execution by the processor 510 configure the hardware platform 500 to perform the operations described in FIGS. 1A to 4 in the various embodiments described in this patent document. The transmitter 515 transmits or sends information or data to another node. For example, a smart node transmitter can send a message to a user equipment. The receiver 520 receives information or data transmitted or sent by another node. For example, a smart node can receive a message from a network node or a user equipment.

Figure 6:
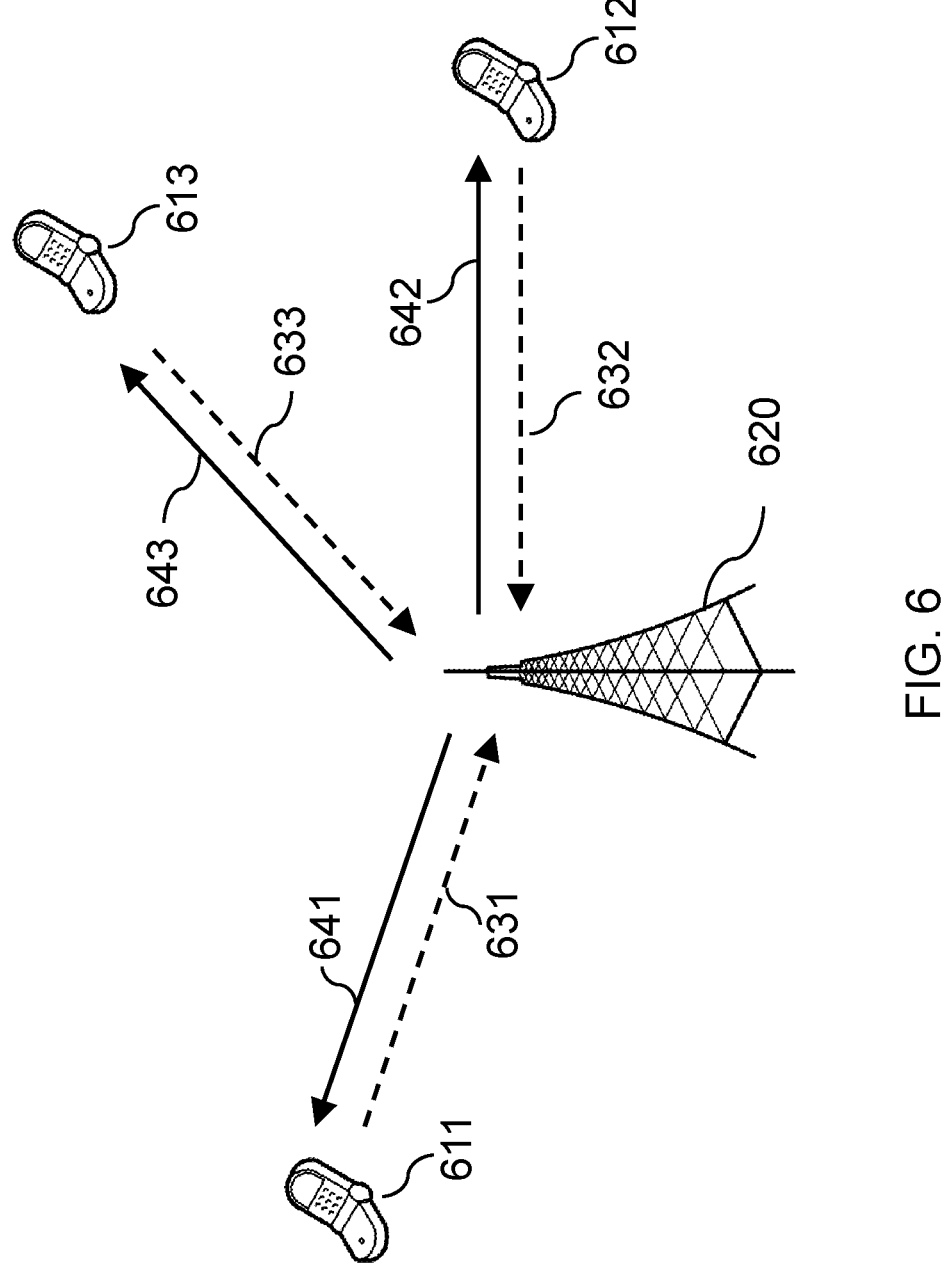
FIG. 6 shows an example of wireless communication including a BS and user equipment (UE) based on some implementations of the disclosed technology.

The implementations as discussed above will apply to a wireless communication. FIG. 6 shows an example of a wireless communication system (e.g., a 5G or NR cellular network) that includes a base station 620 and one or more user equipment (UE) 611, 612 and 613. In some embodiments, the UEs access the BS (e.g., the network) using a communication link to the network (sometimes called uplink direction, as depicted by dashed arrows 631, 632, 633), which then enables subsequent communication (e.g., shown in the direction from the network to the UEs, sometimes called downlink direction, shown by arrows 641, 642, 643) from the BS to the UEs. In some embodiments, the BS send information to the UEs (sometimes called downlink direction, as depicted by arrows 641, 642, 643), which then enables subsequent communication (e.g., shown in the direction from the UEs to the BS, sometimes called uplink direction, shown by dashed arrows 631, 632, 633) from the UEs to the BS. The UE may be, for example, a smartphone, a tablet, a mobile computer, a machine to machine (M2M) device, an Internet of Things (IoT) device, and so on. The uplink and/downlink communication may be performed at last in part via a smart node through which the BS and the UEs can communicate with each other as explained in this patent document.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
   receiving, by a first network node from a second network node, a configuration information that configures the first network node; and
   transmitting, by the first network node to a communication node or to the second network node, a first signal comprising a first information according to the configuration information,
      wherein, prior to the transmitting, the first network node receives from the second network node a second signal comprising a second information that includes the first information, wherein the first network node determines a slot length or a symbol length of the first signal, wherein the slot length or the symbol length is determined using a first sub-carrier spacing from a pre-defined table, wherein the pre-defined table includes a first set of sub-carrier spacing including the first sub-carrier spacing and a second set of sub-carrier spacing including a second sub-carrier spacing, wherein each sub-carrier spacing from the first set of sub-carrier spacing is associated with one sub-carrier spacing from the second set of sub-carrier spacing, and wherein the first network node determines that the first sub-carrier spacing is associated with the second sub-carrier spacing of a reference signal received by the first network node, and wherein the first sub-carrier spacing is determined in response to the first network node determining an absence of an indication of the slot length or the symbol length from the second network node.

2. The method of claim 1, wherein the configuration information is according to a pre-defined rule.

3. The method of claim 1, wherein the configuration information includes a granularity indication, and wherein the granularity indication includes a slot-level indication that indicates whether the first information includes a slot-level information from the second information, or wherein the granularity indication includes a symbol-level indication that indicates whether the first information includes a symbol-level information from the second information.

4. The method of claim 1, wherein the reference signal includes a synchronization signal block (SSB).

5. The method of claim 1, wherein the configuration information includes:

a transmission period that indicates a length of time in which the second information in the second signal is received by the first network node, a frequency band shift value that indicates a difference in frequency between the first signal and the second signal, or one or more frequencies that the first network node is to forward.

6. The method of claim 1, wherein the second network node includes a base station (BS), and wherein the communication node includes a user equipment (UE).

7. A first network node for wireless communication comprising at least one processor, and a non-transitory computer readable program storage medium having code stored thereon, the code, when executed by the at least one processor, cause the first network node to:

receive, from a second network node, a configuration information that configures the first network node; and transmit, to a communication node or to the second network node, a first signal comprising a first information according to the configuration information, wherein, prior to the transmit, the first network node receives from the second network node a second signal comprising a second information that includes the first information, wherein the first network node determines a slot length or a symbol length of the first signal, wherein the slot length or the symbol length is determined using a first sub-carrier spacing from a pre-defined table, wherein the pre-defined table includes a first set of sub-carrier spacing including the first sub-carrier spacing and a second set of sub-carrier spacing including a second sub-carrier spacing, wherein each sub-carrier spacing from the first set of sub-carrier spacing is associated with one sub-carrier spacing from the second set of sub-carrier spacing, wherein the first network node determines that the first sub-carrier spacing is associated with the second sub-carrier spacing of a reference signal received by the first network node, and wherein the first sub-carrier spacing is determined in response to the first network node determining an absence of an indication of the slot length or the symbol length from the second network node.

8. The first network node of claim 7, wherein the configuration information is according to a pre-defined rule.

9. The first network node of claim 7, wherein the configuration information includes a granularity indication, and wherein the granularity indication includes a slot-level indication that indicates whether the first information includes a slot-level information from the second information, or wherein the granularity indication includes a symbol-level indication that indicates whether the first information includes a symbol-level information from the second information.

10. The first network node of claim 7, wherein the reference signal includes a synchronization signal block (SSB).

11. The first network node of claim 7, wherein the configuration information includes:

a transmission period that indicates a length of time in which the second information in the second signal is received by the first network node, a frequency band shift value that indicates a difference in frequency between the first signal and the second signal, or one or more frequencies that the first network node is to forward.

12. The first network node of claim 7, wherein the second network node includes a base station (BS), and wherein the communication node includes a user equipment (UE).

13. A non-transitory computer readable program storage medium having code stored thereon, the code, when executed by at least one processor, causing the at least one processor to implement a method, comprising:

receiving, by a first network node from a second network node, a configuration information that configures the first network node; and transmitting, by the first network node to a communication node or to the second network node, a first signal comprising a first information according to the configuration information, wherein, prior to the transmitting, the first network node receives from the second network node a second signal comprising a second information that includes the first information, wherein the first network node determines a slot length or a symbol length of the first signal, wherein the slot length or the symbol length is determined using a first sub-carrier spacing from a pre-defined table, wherein the pre-defined table includes a first set of
sub-carrier spacing including the first sub-carrier
spacing and a second set of sub-carrier spacing
including a second sub-carrier spacing,
wherein each sub-carrier spacing from the first set of
sub-carrier spacing is associated with one sub-carrier
spacing from the second set of sub-carrier spacing,
and
wherein the first network node determines that the first
sub-carrier spacing is associated with the second
sub-carrier spacing of a reference signal received by
the first network node, and
wherein the first sub-carrier spacing is determined in
response to the first network node determining an
absence of an indication of the slot length or the symbol
length from the second network node.

14. The non-transitory computer readable program storage medium of claim 13, wherein the configuration information is according to a pre-defined rule.

* * * * *